United States Patent [19]

Futagawa

[11] Patent Number: 4,741,488

[45] Date of Patent: May 3, 1988

[54] SPRING ROLLER

[75] Inventor: Toshinobu Futagawa, Tokyo, Japan

[73] Assignee: Futawaga License Corporation, Tokyo, Japan

[21] Appl. No.: 14,287

[22] Filed: Feb. 13, 1987

[30] Foreign Application Priority Data

Feb. 18, 1986 [JP] Japan .................................. 61-33168

[51] Int. Cl.[4] ....................... B65H 16/08; B65H 18/26
[52] U.S. Cl. .............................. 242/67.3 R; 242/75.3; 242/107
[58] Field of Search ............. 242/67.3 R, 75.3, 107.7, 242/107.6, 71.8, 107; 267/57.1 A, 58, 155, 179

[56] References Cited

U.S. PATENT DOCUMENTS 530,327  12/1894  Clark ............................. 242/71.8 X
1,319,961 10/1919  Lowe ............................... 242/75.3
2,514,394  7/1950  Irving ............................ 267/155 X
2,679,709  6/1954  Du Bois ....................... 242/107.7 X
2,995,936  8/1961  Heinzmann .................... 267/155 X
3,974,974  8/1976  Nishikawa ................. 242/67.3 R X
4,253,617  3/1981  Nakagawa ................. 242/67.3 R X Primary Examiner—Stuart S. Levy
Assistant Examiner—Katherine Matecki
Attorney, Agent, or Firm—Wolf, Greenfield & Sacks

[57] ABSTRACT

A spring roller comprising a roller body and end shafts positioned at both end portions of the roller body, one of said end shafts being fixed to the roller body, the other end shaft being connected to the roller body through the medium of an elastic member so that the other end shaft can be rotated relative to the roller body.

3 Claims, 1 Drawing Sheet

SPRING ROLLER

BACKGROUND OF THE INVENTION

The present invention relates to a spring roller, and more particularly it relates to a roller in which a roller shaft and a roller body are interconnected by elastic means so as to permit relative rotational movement between the roller shaft and the roller body.

In general, in an apparatus comprising a pair of rollers and a sheet wound on said rollers, in order to absorb or eliminate any slack of the sheet generated while the sheet is shifted from one roller to the other, a tension bar is used. However, it is not desirable to use this tension bar in such an apparatus, since the tension bar makes the apparatus complicated. Further, amount by which slack of the sheet can be eliminated is limited by the use of a tension bar.

Particularly, a tape driving apparatus previously proposed by the Applicant (refer to Japanese Patent Disclosure No. 171960/85) comprises a pair of rollers (first and second rollers), a tape or sheet wound from its one end of the first roller with one face thereof inside and wound from the other end thereof on the second roller with the other face of the sheet inside, and driving means for selectively driving the first roller or the second roller to shift the sheet from one roller to the other. When this tape driving apparatus is adapted to an item changing mechanism of a multi-purpose codeless input machine, a large number of items are printed, written or disposed on both surfaces of the sheet, and the sheet is shifted by the above-mentioned driving means to position a desired item in a predetermined visual position. However, since the multi-purpose codeless input machine itself is one part of the terminal equipment of a computer system, the item changing mechanism of the input machine must be compact, and accordingly it is also undesirable to use a tension bar in such an item changing mechanism.

SUMMARY OF THE INVENTION

An object of the present invention is to provide a spring roller which can absorb or eliminate slack of a sheet without the presence of a tension bar.

In a preferred embodiment of the present invention, the spring roller comprises a roller body and end shafts situated at both end portions of the roller body, one of the end shafts being fixed to the roller body, the other end shaft being capable of relative rotation with respect to the roller body by interconnecting the other end shaft and the roller body by means of elastic means (preferably, a coil spring).

DETAILED DESCRIPTION OF THE PREFERRED EMBODIMENTS

Figure 1:
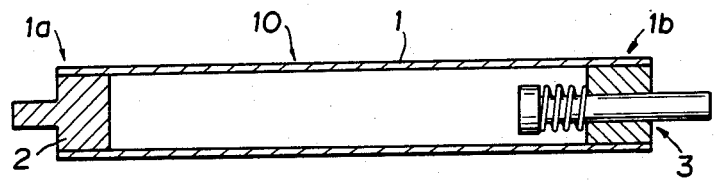
FIG. 1 is a longitudinal sectional view of a spring roller of the present invention.

The present invention will now be described in detail with reference to the drawings showing embodiments of the spring roller according to the invention. As shown in FIG. 1, a spring roller 10 according to the present invention comprises a substantially hollow pipe, i.e., roller body 1, a fixed shaft portion 2 positioned at one end of the roller body, and a spring shaft portion 3 positioned at the other end of the roller body. The fixed shaft portion 2 is fixed to one end 1a of the roller body 1 by appropriate means such as a press fit, screws or the like.

Figure 2:
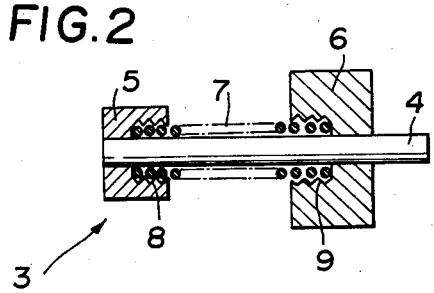
FIG. 2 is an enlarged sectional view of a spring shaft portion of the spring roller of FIG. 1.

As clearly shown in FIG. 2, the spring shaft portion 3 comprises a central end shaft 4, a spring fastening bush 5 fixed to one end of the shaft 4 and having an internally threaded opening 8, a sleeve 6 rotatably mounted around the shaft 4 and having an internally threaded opening 9, and a coil spring 7 positioned around the shaft between the bush 5 and the sleeve 6. The sleeve 6 can be fixed to the other end 1b of the roller body 1 by appropriate means such as a press fit, screws or the like. The coil spring 7 is fixedly connected to the bush 5 and the sleeve 6 by engagement of both ends of the spring with the threaded openings 8 and 9.

Accordingly, when the spring shaft portion 3 is fixed to the other end 1b of the roller body by fitting the sleeve 6 into the pipe 1 by means of a press fit, rotational movement of the shaft 4 can be transmitted to the roller body 1 through the medium of the coil spring 7. Since the connection between the shaft 4 and the body 1 is not a rigid connection but an elastic connection, relative rotational movement between the roller body 1 and the shaft 4 is permitted.

Figure 3:
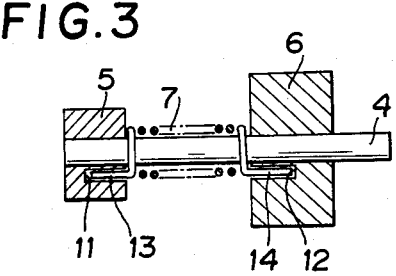
FIG. 3 is an enlarged sectional view of a spring shaft portion according to another embodiment of the invention.

FIG. 3 shows another embodiment of a spring shaft portion. In this embodiment, the bush 5 and the sleeve 6 have small holes 11 and 12 respectively, in lieu of the threaded openings. Further, the coil spring 7 is provided at its both ends with straight portions 13 and 14 extending outwardly from the ends of the spring. In the spring shaft portion of FIG. 3, the bush 5 and the sleeve 6 are interconnected by means of the coil spring 7 on inserting the straight portions 13, 14 of the spring into the small holes 11, 12. Although not shown in the drawings, the coil spring 7 may be fixed to the bush 5 and the sleeve 6 by appropriate means such as an adhesive or pins. Alternatively, one end of the spring 7 can be directly fixed to the shaft 4 by means of an adhesive or the like (in this case, the bush 5 is not used). Further, to avoid eccentric rotation of the shaft 4, the outer diameter of the bush 5 may be slightly smaller than the inner diameter of the pipe 1 so that the peripheral surface of the bush slightly contacts the inner surface of the pipe 1.

Now, the operation and usage of the spring roller according to the present invention will be explained, with reference to a case where the sheet is shifted from one roller to the other such as to completely absorbing any slack in the sheet.

Figure 4:
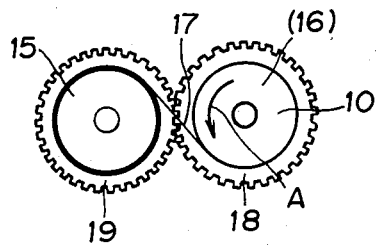
FIG. 4 is a schematic sectional view of a roller driving mechanism, shown for explaining operation and usage of the spring roller of the present invention.

For example, the spring roller of the present invention is assumed to be adapted to a tape driving apparatus such as that described in Japanese Patent Disclosure No. 171960/85, which apparatus was previously developed by the Applicant. In said tape driving apparatus, the tape or sheet 17 (FIG. 4) is wound from its one end on the first roller 15 with one face thereof inside and wound from the other end thereof on the second roller with the other face thereof inside. In this tape driving apparatus, the spring roller of the present invention is used in place of the first roller 15 or the second roller 16. In the example shown in FIG. 4, the spring roller 10 is used as the second roller 16. In this case, gears 18 and 19 of the same diameter are fixed to the rotatable end shaft 4 and an end shaft of the first roller, respectively, in such a way that these gears are engaged with each other. Further, before the engagement of the gears 18, 19, the spring is previously biased so that the roller body of the spring roller 10 is twisted or biased in the direction shown by an arrow A (the direction in which the sheet 17 is pulled). When the apparatus is so assembled, if any slack is generated in the sheet by the simultaneous rotation of the rollers 15, 10 (due to the fact that the length of the sheet unwound from the first roller 15 becomes longer than the length of the sheet taken up by the spring roller 10), the roller body of the spring roller is rotated (independent of the positive rotation thereof effected by the gear drive) by virtue of the spring force acting in the direction shown by the arrow A so as to absorb the slack in the sheet. On the other hand, if the length of the sheet unwound from the spring roller is shorter than the length of the sheet taken up by the first roller, the coil spring 7 in the spring roller 10 is farther twisted so as to pay out the sheet (from the spring roller) without any slack.

Therefore, the spring roller of the present invention can effectively absorb or eliminate any slack in the sheet without the use of any tension bars, with the result that the apparatus utilizing the spring roller of the present invention is very compact. Further, the spring roller of the present invention does not in any way restrict the elimination of slack in the sheet.

The spring roller of the present invention is particularly effective when it is adapted to the various tape driving apparatuses previously proposed by the Applicant.

This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In apparatus for transferring a sheet of material from a first roller to a second roller, both of said rollers having parallel longitudinal axes, said second roller being driven from a rotating drive shaft and said sheet unwinding from said first roller and winding onto said second roller, the improvement wherein said second roller is a spring roller for absorbing slack in said sheet, said spring roller comprising,
   a hollow, cylindrical roller body having a first end and a second end,
   a second shaft aligned with the longitudinal axis of said roller body and fixed to said first end of said roller body providing an axis around which said roller body can rotate,
   a sleeve fixed to said second end of said roller body, said sleeve having a first hole therethrough, said first hole extending along the longitudinal axis of said roller body, said drive shaft having a first end extending through said first hole in said sleeve into said roller body,
   a torsion spring having a first and a second end and being wound around the portion of said drive shaft extending into said roller body,
   means for connecting said first end of said spring to said first end of said drive shaft, and
   means for connecting said second end of said spring to said sleeve so that, during the transfer to said sheet from said first roller to said second roller, said spring is under tension and can absorb slack by allowing relative rotation between said spring roller and said drive shaft.

2. The improvement according to claim 1 wherein a bush is attached to said first end of said drive shaft and said spring extends between said bush and said sleeve.

3. The improvement according to claim 2 wherein said bush has a second hole with an axis parallel to the longitudinal axis of said drive shaft, said sleeve has a third hole having an axis parallel to the axis of said first hole in said sleeve and said spring has a first straight end portion extending parallel to the longitudinal axis of said drive shaft and a second straight end portion extending parallel to the longitudinal axis of said drive shaft, said first end portion of said spring engaging said second hole in said bush and said second end portion of said spring engaging said third hole in said sleeve so that said spring is connected to said bush and said sleeve.

* * * * *